United States Patent
Nishiwaki et al.

(10) Patent No.: US 8,188,179 B2
(45) Date of Patent: May 29, 2012

(54) INK-JET RECORDING PIGMENT INK

(75) Inventors: Yuko Nishiwaki, Mitaka (JP); Kenji Nishiguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 450 days.

(21) Appl. No.: 11/954,965

(22) Filed: Dec. 12, 2007

(65) Prior Publication Data

US 2008/0146723 A1 Jun. 19, 2008

(30) Foreign Application Priority Data

Dec. 14, 2006 (JP) ................. 2006-336584

(51) Int. Cl.
- C09D 11/00 (2006.01)
- C09D 5/00 (2006.01)
- C09D 5/02 (2006.01)
- C08F 2/16 (2006.01)
- C08L 31/00 (2006.01)
- C08L 33/00 (2006.01)
- C08L 83/00 (2006.01)
- C08L 83/04 (2006.01)
- C08G 63/60 (2006.01)

(52) U.S. Cl. ........ 524/556; 524/460; 524/588; 524/599; 523/160; 523/161

(58) Field of Classification Search ........ 523/160, 523/161; 524/145, 608, 506, 81, 460, 556, 524/588, 599; 106/20, 21, 31.65
See application file for complete search history.

(56) References Cited

U.S. PATENT DOCUMENTS

| | | | | |
|---|---|---|---|---|
| 5,561,014 A * | 10/1996 | Kato | ............... | 430/49.31 |
| 5,714,538 A | 2/1998 | Beach et al. | ............... | 524/504 |
| 5,719,204 A | 2/1998 | Beach et al. | ............... | 523/161 |
| 6,087,416 A * | 7/2000 | Pearlstine et al. | ............... | 523/160 |
| 6,124,376 A * | 9/2000 | Nichols et al. | ............... | 523/160 |
| 6,627,696 B1 * | 9/2003 | Takao et al. | ............... | 524/588 |
| 6,960,622 B2 * | 11/2005 | Nakano | ............... | 523/160 |
| 7,141,346 B2 * | 11/2006 | Teraoka et al. | ............... | 430/115 |
| 7,307,109 B2 * | 12/2007 | Yatake et al. | ............... | 523/160 |
| 7,331,665 B2 * | 2/2008 | Tomotake et al. | ............... | 347/100 |
| 7,342,067 B2 * | 3/2008 | Hama et al. | ............... | 524/556 |
| 2003/0106462 A1 * | 6/2003 | Yatake et al. | ............... | 106/31.59 |
| 2004/0006159 A1 * | 1/2004 | Horie et al. | ............... | 523/160 |
| 2004/0212667 A1 | 10/2004 | Nishiguchi | ............... | 347/96 |
| 2005/0075418 A1 | 4/2005 | Nishiguchi | ............... | 523/160 |
| 2006/0089423 A1 * | 4/2006 | Ueno et al. | ............... | 523/160 |
| 2006/0270756 A1 * | 11/2006 | Hanmura et al. | ............... | 523/160 |
| 2007/0043146 A1 * | 2/2007 | House et al. | ............... | 523/160 |
| 2007/0054981 A1 * | 3/2007 | Yanagi et al. | ............... | 523/160 |
| 2007/0287769 A1 | 12/2007 | Nishiwaki et al. | ............... | 523/160 |
| 2007/0287770 A1 | 12/2007 | Nishiguchi et al. | ............... | 523/160 |

FOREIGN PATENT DOCUMENTS

| JP | 8-193177 | 7/1996 |
|---|---|---|
| JP | 2003-105236 | 4/2003 |
| JP | 2004-346173 | 12/2004 |

* cited by examiner

Primary Examiner — Mark Eashoo
Assistant Examiner — Angela C Scott
(74) Attorney, Agent, or Firm — Fitzpatrick, Cella, Harper & Scinto

(57) ABSTRACT

An ink-jet recording pigment ink comprises water, a pigment, a water-soluble organic solvent and a copolymer; the copolymer being obtained by copolymerizing a silicone type macromer having a vinyl group, represented by the following Formula (1), a vinyl monomer having a hydrocarbon group having 1 to 8 carbon atoms, represented by the following Formula (2), and a monomer having an anionic functional group.

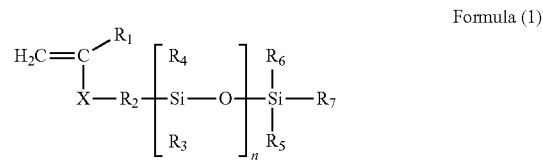

Formula (1)

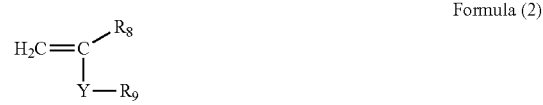

Formula (2)

30 Claims, No Drawings

INK-JET RECORDING PIGMENT INK

BACKGROUND OF THE INVENTION

1. Field of the Invention

This invention relates to an ink-jet recording pigment ink which has superior dispersion stability and storage stability, and can achieve a high ejection stability even when used in an ink-jet recording process of a system in which heat energy is used as ejection energy to eject inks. More particularly, this invention relates to an ink-jet recording pigment ink which, where images are printed on gloss paper used generally as recording mediums for ink-jet recording, can give images having a sufficient scratch resistance and also cannot easily cause offset or the like also when some sheets of gloss paper are superposed.

2. Description of the Related Art

As inks used in ink-jet recording, which are used in ink-jet recording processes, dye inks have been prevalent which make use of, as colorants, dyes which are soluble in the chief-component water. The dye inks have advantages that they have superior long-term storage stability and can not easily cause any nozzle clogging during ejection and also that print with superior chroma and transparency can be obtained. However, they, on the other hand, have a problem that the print obtained lacks in weatherability and water resistance.

Accordingly, in recent years, in order to improve weatherability of the print, pigment inks making use of pigments as colorants attract notice and have come to be in use. The pigments are not soluble in water, and hence the pigments must be dispersed in ink solvents in order for the pigment inks to be used as inks. It, however, is difficult to keep a good state of dispersion of pigments over a long period of time while keeping pigment particles from agglomerating or settling. Thus, no stable ejection performance is achievable in some cases. Especially where an electrothermal transducer is used as a means for supplying the ejection energy, air bubbles are generated by providing an ink with heat energy, to eject ink droplets, and hence it is expected that physical properties of the ink change abruptly because of the heat energy at the time of bubbling. Accordingly, where pigment inks having a low dispersion stability are ejected by the ink-jet recording system, it has sometimes come about that no stable ejection performance is achievable because of, e.g., deposits having formed in nozzles.

Meanwhile, in the case when the pigment inks are used, problems as stated below may arise with regard to ink-jet recording mediums as well. In order to make the recording performable in a high image quality, an ink-jet recording medium has conventionally been used in which an ink-receiving layer having voids in a large number is provided so as for the recording medium to be improved in ink absorptivity. Where images are formed on such an ink-jet recording medium, in the case of the dye ink, the ink is immediately absorbed in the ink-receiving layer because dye molecules stand dissolved in the ink, so that recorded images with a high image quality can be obtained. However, in the case when images are printed on such a recording medium by using the pigment ink, most pigment particles standing dispersed in the ink are larger than the voids of the ink-receiving layer of the recording medium, and hence these pigment particles come to be fixed to the recording medium surface. As a result, recorded images formed of the pigment ink have a scratch resistance inferior to the case when the dye ink is used. There has been such a problem. Further, where images are continuously printed on a plurality of such recording mediums, another problem has sometimes come about such that, when recorded images are put upon one another through recording mediums on a paper delivery tray, the recorded images set off to the back of the recording mediums superposed to come to stick together. The present inventors have considered whether this problem could be resolved by improving the releasability between the recorded images and the recording medium, where they made studies on the background art.

As a technique by which releasability can be improved, it has hitherto been common to use silicone materials in various fields. For example, as products making use of sheets improved in releasability, they may include release sheets used for various kinds of functional sheets and films having pressure-sensitive adhesive force or other adhesive force. The release sheets are used to protect pressure-sensitive adhesive layers or other adhesive layers of various kinds of functional sheets and films having pressure-sensitive adhesive force or other adhesive force. More specifically, these are used in order to prevent the pressure-sensitive adhesive layers or other adhesive layers from coming into contact with foreign materials to stick together or prevent any dirt from adhering to lower the pressure-sensitive adhesive force or other adhesive force, by the time that these various kinds of functional sheets and films are stuck to any adherends. Accordingly, in order to protect the pressure-sensitive adhesive force or other adhesive force of functional sheets and films, such release sheets must be kept to adhere firmly to the films or the like. On the other hand, the release sheets must be peeled from the functional films or the like when the films or the like are stuck to adherends, thus the releasability is an important factor. This releasability is commonly obtained by coating a base material surface with a silicone type material, and it is common to use the silicone type material to impart such releasability.

Here, the silicone type material refers to a material having structure wherein siloxane linkages formed of i) silicon atoms to which alkyl groups or the like stand bonded and ii) oxygen atoms are arranged in a large number. Characteristic features of such a silicone type material are that, because of its strong linkage between silicon and oxygen, it has high thermal and chemical stabilities and also has high electrical insulating properties. Also, because of its small mutual action between molecules and low interface tension (surface tension), it is variously applied in various fields as a material having good releasability or release properties and also having a high water repellency. Taking note of the use of such a silicone type material in inks for ink-jet recording, the following two types of inks are conventionally known in the art. That is, they are an ink to which a silicone type surface-active agent has been added and an ink to which a silicone type polymer has been added.

Of the foregoing, there are many proposals in which the silicone type surface-active agent has been added. All of such proposals, however, are made in order to change the surface tension that is a liquid physical property of inks. Hence, in all cases, the silicone type surface-active agent is limited to its use as a permeating agent for improving permeability of ink into paper or as an antifoaming agent which prevents ink from foaming (see Japanese Patent Applications Laid-open No. H08-193177 and No. 2003-105236). To add such a surface-active agent in a large quantity means to extremely lower the surface tension that is an ink physical property. Accordingly, in adding the surface-active agent in a large quantity, there is a possibility of bringing about problems such that it becomes unable to eject the ink from an ink-jet recording head and that the ink permeates into the paper so excessively as to result in a low print density. That is, in the above ink-jet recording inks, the silicone type surface-active agent is only added to the ink so far as the ink can be ejected. Thus, any special effect on recorded images as aimed in the present invention is considered not to have been brought out.

In contrast thereto, as a technique in which the silicone type polymer is added to the ink, a proposal is made on achieving an improvement in water resistance of images by adding a water-insoluble silicone type vinyl polymer (see Japanese Patent Application Laid-open No. 2004-346173). In such a publication, it is disclosed to use a silicone type vinyl polymer having been made insoluble in water by copolymerizing a silicone macromer with a monomer having long-chain alkyl group having 12 or more carbon atoms or a styrene macromer. Then, it is disclosed that the use of such a polymer in water base inks for ink-jet recording brings an improvement in water resistance and storage stability of images and can impart a high print density. It is further disclosed that, the above polymer is so low hydrophilic as not to easily permeate into printing paper, so that the vinyl polymer remains on the paper surface, and hence the water resistance of recorded images can be improved, and also the coloring material can be inhibited from permeating into the printing paper to make higher the print density of the print obtained.

However, according to studies made by the present inventors, the ink containing the water-insoluble silicone type vinyl polymer as above causes a problem as stated below, especially when images are printed by the above ink-jet recording process making use of an electrothermal transducer as a means for supplying the ejection energy. That is, it has been found that, in the case of such an ink-jet recording process, physical properties of ink change abruptly because the heat energy is applied to the ink at the time of bubbling, so that, e.g., components insoluble in water may come to be deposited in nozzles to make stable ejection performance not easily achievable.

SUMMARY OF THE INVENTION

Accordingly, an object of the present invention is to provide an ink-jet recording pigment ink having a very superior dispersion stability. In particular, it is to provide an ink-jet recording pigment ink having a high ejection stability also when used in the ink-jet recording process of a thermal ink-jet recording system in which heat energy is given to an ink as ejection energy to eject the ink.

A further object of the present invention is, in addition to the foregoing, to provide an ink-jet recording pigment ink which, where images are printed on gloss paper used as recording mediums for ink-jet recording, can obtain recorded images that are free of offset even when a plurality of sheets of gloss paper are superposed immediately after printing.

The above objects can be achieved by the present invention described below. That is, the ink-jet recording pigment ink of the present invention is an ink-jet recording pigment ink comprising water, a pigment, a water-soluble organic solvent and a copolymer, and is characterized in that the copolymer is a copolymer obtained by copolymerizing a silicone type macromer having a vinyl group, represented by the following Formula (1), a vinyl monomer having a hydrocarbon group having 1 to 8 carbon atoms, represented by the following Formula (2), and a monomer having an anionic functional group.

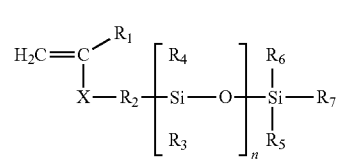

Formula (1)

wherein X represents a single bond or an ester group, $R_1$ represents a hydrogen atom or a methyl group, $R_2$ represents a single bond or an alkylene group having 1 to 4 carbon atoms, $R_3$ to $R_6$ each independently represent an alkyl group having 1 to 4 carbon atoms, $R_7$ represents a hydrocarbon group which may have a hetero atom, and n represents an integer of 8 or more.

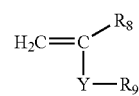

Formula (2)

wherein Y represents a single bond, an ester group or an amide group, $R_8$ represents a hydrogen atom or a methyl group, and $R_9$ represents a hydrocarbon group having 1 to 8 carbon atoms.

According to the present invention, an ink-jet recording pigment ink is provided which has a very superior dispersion stability and also has a high ejection stability even when used in the ink-jet recording process of a thermal ink-jet recording system in which heat energy is given to an ink as ejection energy to eject the ink. In addition, according to the present invention, an ink-jet recording pigment ink is provided which can obtain recorded images endowed with a superior releasability, that are free of offset even when a plurality of sheets of gloss paper are superposed immediately after printing; the gloss paper being a recording medium for ink-jet recording.

Further features of the present invention will become apparent from the following description of exemplary embodiments.

DESCRIPTION OF THE EMBODIMENTS

The ink of the present invention is described below in detail by giving preferred embodiments. The ink-jet recording pigment ink of the present invention contains at least water, a pigment, a water-soluble organic solvent and a copolymer, and is characterized in that the copolymer is the copolymer obtained by copolymerizing a silicone type macromer having a vinyl group, represented by the above Formula (1), a vinyl monomer having a hydrocarbon group having 1 to 8 carbon atoms, represented by the above Formula (2), and a monomer having an anionic functional group.

As stated previously, the present invention has been accomplished as a result of studies made on the basis of an idea that, in order to obtain recorded images that are free of offset even when a plurality of sheets of gloss paper are superposed immediately after printing, it is important to improve the releasability between the recorded images and the back sides of the gloss paper. More specifically, in the present invention, a copolymer making use of a specific silicone type macromer is used as a constituent of the ink-jet recording pigment ink so as to impart a superior releasability to the recorded images formed by using the ink. The silicone type macromer that characterizes the present invention is described first.

In the present invention, the pigment ink is incorporated therein with a copolymer prepared by copolymerizing as a component a silicone type macromer having a vinyl group, represented by the following Formula (1), and this has made it able to impart to the recorded images to be printed, a high releasability between the recorded images and the back side of the recording medium. The silicone type macromer is one in which, to make up a macromer, a vinyl group and an acryloyl (or methacryloyl) group which are polymerizable functional groups are introduced into a silicone structure wherein siloxane linkages formed of i) silicon atoms to which alkyl groups having 1 to 4 carbon atoms stand bonded and ii) oxygen atoms are arranged in a large number. In the present invention, a silicone type macromer having structure represented by the following Formula (1) is used.

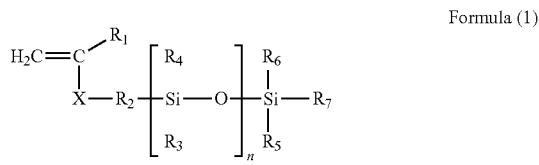

Formula (1)

wherein X represents a single bond or an ester group, $R_1$ represents a hydrogen atom or a methyl group, $R_2$ represents a single bond or an alkylene group having 1 to 4 carbon atoms, $R_3$ to $R_6$ each independently represent an alkyl group having 1 to 4 carbon atoms, $R_7$ represents a hydrocarbon group which may have a hetero atom, and n represents an integer of 8 or more.

Silicone type materials have various specific properties including the releasability referred to as above. Such properties come from the features that organic-matter alkyl groups stand bonded to inorganic-matter silicon atoms and that such silicon atoms and oxygen atoms form siloxane linkages, which are arranged in a large number. Accordingly, in the present invention, a silicone type macromer is used which has structure wherein the siloxane linkages are arranged in a number of eight or more. In order to make the pigment ink of the present invention an ink the ejection stability of which can be maintained in the above thermal ink-jet recording system, the copolymer to be incorporated in the ink may preferably have water-solubility. Accordingly, in order to make the copolymer improved in water-solubility, the silicone type macromer represented by the above Formula (1) may preferably have a number average molecular weight of 6,000 or less.

In the present invention, together with such a silicone type macromer, a vinyl monomer having a hydrocarbon group having 1 to 8 carbon atoms, represented by Formula (2) detailed later, and a monomer having an anionic functional group are further used as copolymerization components in order to obtain the copolymer. These copolymerization component monomers used in the present invention are described below in detail. The silicone type macromer represented by Formula (1) as described above is more detailed first.

In the above Formula (1), the group X between the polymerizable linking group and the silicone moiety includes a single bond or an ester group; $R_1$ is a hydrogen atom or a methyl group; and $R_2$ is a single bond or an alkylene group having 1 to 4 carbon atoms. The alkyl groups represented by $R_3$ to $R_6$, bonded to the silicon atoms, are each independently an alkyl group having 1 to 4 carbon atoms. These alkyl groups having 1 to 4 carbon atoms may be any of straight-chain or branched-chain alkyl groups and cyclic alkyl groups. Of these, particularly preferred are straight-chain or branched-chain alkyl groups. In the foregoing, the macromer comes bulky if each alkyl group has more than 4 carbon atoms. Accordingly, where the copolymer is synthesized using a silicone type macromer having such structure, it follows that the copolymer has a low water-solubility, as being unsuitable. Meanwhile, the terminal group $R_7$ of the silicone type macromer may change depending on how to synthesize the silicone and the silicone type macromer. Hence, the terminal group $R_7$ in Formula (1) may be any hydrocarbon group which may have a hetero atom, any of which may preferably be used.

The vinyl monomer having a hydrocarbon group having 1 to 8 carbon atoms, represented by the following Formula (2), which is used to form the copolymer used in the present invention is described next.

Formula (2)

wherein Y represents a single bond, an ester group or an amide group, $R_8$ represents a hydrogen atom or a methyl group, and $R_9$ represents a hydrocarbon group having 1 to 8 carbon atoms.

The vinyl monomer having a hydrocarbon group having 1 to 8 carbon atoms, represented by the above Formula (2), has the function to control the copolymerizability with various monomers. Hence, it is preferable to use this monomer as one of materials for synthesizing the copolymer used in the present invention to effect copolymerization.

The ester group in the above Formula (2) refers to a —C(=O)O— group, and the amide group refers to a —C(=O)N($R_{10}$)— group. Here, $R_{10}$ is a hydrogen atom, a methyl group or an ethyl group. The hydrocarbon group having 1 to 8 carbon atoms, represented by $R_9$, may be a straight-chain or branched-chain alkyl group, a cyclic alkyl group, or a hydrocarbon group having a benzene ring. As specific examples, it may include the following: For example, vinyl compounds such as ethylene, propylene, butylene and styrene; acrylates (or methacrylates) such as methyl acrylate (or methacrylate), ethyl acrylate (or methacrylate), n-butyl acrylate (or methacrylate), t-butyl acrylate (or methacrylate), cyclohexyl acrylate (or methacrylate), and benzyl acrylate (or methacrylate); and acrylamides (or methacrylamides) such as N-methyl acrylamide (or methacrylamide), N-ethyl acrylamide (or methacrylamide), N,N-dimethyl acrylamide, N,N-diethyl acrylamide, N-butyl acrylamide (or methacrylamide), t-butyl acrylamide (or methacrylamide), N-cyclohexyl acrylamide (or methacrylamide), N-(1-ethyl-1-methylpropyl) acrylamide, and N-benzyl acrylamide (or methacrylamide).

As described previously, the copolymer used in the present invention may preferably be water-soluble. Accordingly, the above vinyl monomer having a hydrocarbon group having 1 to 8 carbon atoms is used in the present invention. In contrast thereto, if a vinyl monomer having a hydrocarbon group having 9 or more carbon atoms is used, the copolymer to be formed may become low water-soluble and not soluble in the ink, as being unsuitable.

There are no particular limitations on the copolymerization ratio of the silicone type macromer having a vinyl group, represented by the following Formula (1), to the vinyl monomer having a hydrocarbon group having 1 to 8 carbon atoms, represented by the above Formula (2). A better effect is obtained when this ratio is the following: It may preferably be silicone type macromer:vinyl monomer=1:1 to 1:10 in mass ratio. There are also no particular limitations on the content of the silicone type macromer in the copolymer. Its content may preferably be from 5% by mass to 40% by mass. If the ratio of the silicone type macromer to the vinyl monomer is more than 1:1 or if the content of the silicone type macromer in the copolymer is more than 40% by mass, the copolymer may come low water-soluble, as being undesirable. If, on the other hand, the ratio of the silicone type macromer to the vinyl monomer is less than 1:10 or if the content of the silicone type macromer in the copolymer is less than 5% by mass, the releasability as aimed in the present invention may insufficiently be imparted to the recorded images, as being undesirable.

The monomer having an anionic functional group that is used in the present invention is described next. The monomer having an anionic functional group is a copolymerization component used in order to impart water-solubility to the copolymer used in the present invention. The monomer having an anionic functional group may include the following: Monomers having a carboxyl group, such as acrylic acid, methacrylic acid, maleic acid (or anhydride), itaconic acid and fumaric acid; and monomer materials having a sulfo group or phosphono group, such as vinylsulfonic acid, p-vinylbenzenesulfonic acid and vinylphosphonic acid. As the monomer component that can impart water-solubility to the copolymer, besides the monomer having an anionic functional group that is used in the present invention, it may include the following: Monomers having a hydroxyl group, as exemplified by hydroxyalkyl ester acrylates (or methacrylates), and monoester acrylates (or methacrylates) of polyhydric alcohols such as ethylene glycol; and monomers having an oxyalkylene group, as exemplified by ester acrylates (or methacrylates) of ethylene oxide or propylene oxide. However, in the case of a copolymer formed by copolymerizing these monomers, when incorporated in the ink, the ink may come poorly fixable to paper when it is fixed, as being undesirable.

As the monomer having an anionic functional group, the monomers having a carboxyl group is preferred. What is most preferred is acrylic acid. In the case when the acrylic acid is used, the copolymer can be highly water-soluble, and hence the copolymer can be more stable in the ink and the ink can have a higher ejection stability in the thermal ink-jet recording system, as being preferable. Where the copolymer is one copolymerized using the acrylic acid monomer as a macromer, the copolymer to be added is endowed with repulsion force in virtue of steric-hindrance repulsion. Hence, ink physical properties such as surface tension and viscosity can not easily change even when the copolymer added to the ink is in a larger quantity, and the ejection stability of ink in the thermal ink-jet recording system can be maintained, as being preferable.

Besides, a copolymerizable monomer(s) usable when the copolymer used in the present invention is obtained may include the following. Any of these may be incorporated to such an extent that may not obstruct the hydrophilic property of the copolymer. It may include, e.g., hydrophilic monomers such as hydroxyalkyl ester acrylates (or methacrylates), and monoester acrylates (or methacrylates) of polyhydric alcohols such as ethylene glycol; vinyl type monomers having an aromatic functional group, such as vinyl monomers or acrylate (or methacrylate) monomers or acrylamide (or methacrylamide) monomers each having a hydrocarbon group having 9 or more carbon atoms, 4-vinylbenzoic acid, vinylbenzoates and N-vinylcarbazole; ester acrylates (or methacrylates) such as cyclohexyl acrylate (or methacrylate), and acrylamide type monomers such as acrylamide (or methacrylamide), N-methylol acrylamide (or methacrylamide), and N,N-dimethylamino-propyl acrylamide (or methacrylamide); and vinyl type monomers such as N-vinyl acetamide, N-vinyl formamide, and vinyl acetate, and ethylene oxide or propylene oxide modified compounds of any of these.

The copolymer used in the present invention, obtained by copolymerizing such components as described above, may preferably have its acid value within the range of from 50 mgKOH/g or more to 250 mgKOH/g or less. If the copolymer has an acid value of less than 50 mgKOH/g, the copolymer may be low soluble in the ink solvent to make it unable to maintain the stability of the pigment standing dispersed in the ink, as being undesirable. If on the other hand the copolymer has an acid value of more than 250 mgKOH/g, the ink may have so high viscosity as to become poorly ejected, as being undesirable.

The copolymer used in the present invention may preferably have weight average molecular weight within the range of from 2,000 to 15,000. If the copolymer has a weight average molecular weight of more than 15,000, the copolymer may be low water-soluble, as being undesirable.

The copolymer used in the present invention, made up as described above, may be used as the water-soluble polymer to be added to the ink as an additive, or may be used as a dispersing polymer for dispersing the pigment, which is described later. According to studies made by the present inventors, its use as the water-soluble polymer added as an additive is more effective in bringing out functions than its use as the dispersing polymer. Such a copolymer may preferably be incorporated in an amount ranging from 0.1% by mass to 15% by mass based on the total mass of the pigment ink. As the copolymer, a plurality of copolymers may optionally be used in combination, or copolymers may be used which are different depending on the pigment to be used.

The dispersing polymer usable in the pigment ink of the present invention may be the copolymer defined in the present invention as described above. Besides, also usable are those enumerated below. For example, they may be any polymers such as vinyl type polymers (or copolymers), polysaccharides, polypeptides, polyamide, polyesters, polyethers and polyolefins. It is preferable to use water-soluble polymers. The form of the dispersing polymer may be any of a random copolymer, a block copolymer and a graft copolymer. In particular, a block copolymer or graft copolymer having both hydrophobic segments and hydrophilic segments may be used. This is preferable because the pigment is improved in dispersion stability in the ink. The reason therefor is presumed as in the following. First, the hydrophobic segments making up any of these copolymers so function as to become adsorbed on the surfaces of hydrophobic pigment particles by hydrophobic mutual action. On the other hand, the hydrophilic segments making up any of these copolymers spread into the water that is the ink solvent, and so function as to endow the pigment particles with repulsion force in virtue of steric-hindrance repulsion acting mutually between hydrophilic segments. Then, in the block copolymer or graft copolymer having hydrophobic segments and hydrophilic segments both of which stand clearly separate, these segments function efficiently, and hence such a copolymer is a polymer form most preferable in the aqueous ink-jet recording pigment ink.

The polymerization in synthesizing the copolymer to be incorporated in the pigment ink of the present invention may be of any mechanism as long as it is addition polymerization. The polymerization may be carried out by any known polymerization mechanism such as radical polymerization, anionic polymerization or cationic polymerization. The copolymer may also be obtained from monomers having vinyl groups, by any of known polymerization processes such as bulk polymerization, solution polymerization, suspension polymerization and emulsion polymerization.

To the pigment ink of the present invention, a base may be added in order to well disperse the above copolymer in an aqueous medium of the ink; the aqueous medium being composed of water and a water-soluble organic solvent. The base usable here may include the following, any of which may be used under appropriate selection, as exemplified by organic amines such as ammonia, monoethanolamine, diethanolamine, triethanolamine, amine methylpropanol, and N,N-dimethylethanolamine; and alkali metal hydroxides such as potassium hydroxide and sodium hydroxide.

To the pigment ink of the present invention, a water-soluble polymer may also be added in addition to the copolymer that is essential to the present invention. The water-soluble polymer may include acrylic (or methacrylic) polymers, polyamide polymers, polyester polymers, polypeptides, cellulose and modified products thereof, polyvinyl alcohol, and polyolefins. Any of these polymers may preferably be added in substantially the same amount as the copolymer that is essential to the present invention or in a proportion not more than that. Such a base as described above may further be added in order to improve the solubility of these water-soluble polymers.

The pigment used in the ink-jet recording pigment ink of the present invention may be any of inorganic pigments and organic pigments. The pigment may be used in an amount ranging from 1% by mass to 20% by mass, and preferably from 2% by mass to 12% by mass, in mass ratio, based on the total mass of the ink.

The pigment usable in the present invention may specifically include the following. As a black pigment, it may include, e.g., carbon black produced by the furnace method or channel method. In particular, preferred is carbon black having a DBP oil absorption of from 40 to 200 ml/100 g, a primary particle diameter of from 11 to 40 m$\mu$m (nm), a BET method specific surface area of from 50 to 400 m$^2$/g, and a volatile content of from 0.5% to 10%. As commercially available products having such properties, they may include the following, any of which may preferably be used. For example, No. 2300, No. 900, No. 950, MCF-88, No. 33, No. 40, No. 45, No. 52, MA7, MA8, and No. 2200B (all available from Mitsubishi Chemicals, Inc.); RAVEN 1255 (available from Columbian Carbon Japan Limited); REGAL 400R, REGAL 330R, REGAL 660R, and MOGUL L (all available from Cabot Corp.); COLOR BLACK FW1, COLOR BLACK FW285, COLOR BLACK FW18, COLOR BLACK S170, COLOR BLACK S160, HIBLACK 900, HIBLACK 890, PRINTEX 35, and PRINTEX U (all available from Degussa Corp.).

A yellow pigment may include the following, as exemplified by C.I. Pigment Yellow 1, C.I. Pigment Yellow 2, C.I. Pigment Yellow 3, C.I. Pigment Yellow 13, C.I. Pigment Yellow 16, C.I. Pigment Yellow 74, C.I. Pigment Yellow 83, C.I. Pigment Yellow 110 and C.I. Pigment Yellow 128.

A magenta pigment may include the following, as exemplified by C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 112, C.I. Pigment Red 122, C.I. Pigment Red 166 and C.I. Pigment Red 206.

A Cyan pigment may include the following, as exemplified by C.I. Pigment Blue 1, C.I. Pigment Blue 2, C.I. Pigment Blue 3, C.I. Pigment Blue 15:3, C.I. Pigment Blue 15:4, C.I. Pigment Blue 15:6, C.I. Pigment Blue 16, C.I. Pigment Blue 22, C.I. Pigment Blue 25, C.I. Pigment Blue 60, C.I. Pigment Blue 66, C.I. Vat Blue 4 and C.I. Vat Blue 6.

Other pigments may also include, e.g., C.I. Pigment Orange 5, C.I. Pigment Orange 13, C.I. Pigment Orange 16, C.I. Pigment Orange 22, C.I. Pigment Orange 36, C.I. Pigment Brown 25, C.I. Pigment Green 7, C.I. Pigment Green 8, C.I. Pigment Green 36, C.I. Pigment Violet 19, C.I. Pigment Violet 29 and C.I. Pigment Violet 37. Of course, in the present invention, examples are by no means limited to these. Besides the foregoing, pigments produced newly may of course be used.

The ink-jet recording pigment ink of the present invention contains, besides the pigment and copolymer described above, at least a mixed solvent composed of water and a water-soluble organic solvent and in which the pigment and the copolymer are to be dispersed or dissolved. As the water used here, it is preferable to use not usual water, which contains various ions, but ion-exchanged water (deionized water). The water-soluble organic solvent used in the form of a mixture with the water may include the following, as preferred examples. It may include, e.g., alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones or ketoalcohols such as acetone and diacetone alcohol; ethers such as tetrahydrofuran and dioxane; polyalkylene glycols such as polyethylene glycol and polypropylene glycol; alkylene glycols whose alkylene groups have 2 to 6 carbon atoms, such as ethylene glycol, propylene glycol, butylene glycol, triethylene glycol, 1,2,6-hexanetriol, thiodiglycol, hexylene glycol, and diethylene glycol; glycerol; lower alkyl ethers of polyhydric alcohols, such as ethylene glycol monomethyl (or ethyl) ether, diethylene glycol methyl (or ethyl) ether, and triethylene glycol monomethyl (or ethyl) ether; and N-methyl-2-pyrrolidone, 2-pyrrolidone, and 1,3-dimethyl-2-imidazolidinone. Of these many water-soluble organic solvents, it is preferable to use polyhydric alcohols such as diethylene glycol, and lower alkyl ethers of polyhydric alcohols, such as triethylene glycol monomethyl(or ethyl) ether.

Such a water-soluble organic solvent as described above may preferably be contained in the ink commonly in an amount ranging from 3% by mass to 50% by mass, and more preferably ranging from 3% by mass to 40% by mass, based on the total mass of the pigment ink. The water to be used may be in a content ranging from 10% by mass to 90% by mass, and preferably from 30% by mass to 80% by mass, based on the total mass of the pigment ink.

The ink-jet recording pigment ink of the present invention may preferably be one having been adjusted to be neutral or alkaline, as the whole ink. As long as the ink thus adjusted is used, the electrostatic repulsion force can act between fine pigment particles to enhance the dispersion stability, and the ink can be a pigment ink having much superior long-term storage stability, as being preferable. In this case, however, the ink may cause corrosion of various members used in ink-jet recording apparatus, and hence may preferably have a pH value in the range of from 7 to 10.

As the pigment ink in the present invention, in addition to the above components, a surface-active agent, an anti-foaming agent, an antiseptic and so forth may be added in order to make the pigment ink have any desired physical properties as occasion calls. In particular, a surface-active agent which functions as a permeation accelerator may preferably be added in a quantity proper enough to take a role in making liquid components of the pigment ink permeate quickly into recording mediums. Such a surface-active agent may preferably be added in an amount of, e.g., from 0.05% by mass to 10% by mass, and more preferably from 0.5% by mass to 5% by mass.

How to prepare the pigment ink of the present invention, composed as described above, is described below. First, the pigment is added to an aqueous medium prepared by mixing at least the dispersing polymer and the water, and these are mixed and stirred, followed by dispersion using a dispersing means described later, and then optionally classification treatment to remove coarse particles, such as centrifugal treatment, to obtain the desired pigment dispersion. Next, to the pigment dispersion obtained, a sizing agent and such additive components as exemplified above which have appropriately been selected are added, followed by stirring to make up the pigment ink of the present invention.

Where the dispersing polymer does not dissolve completely in the aqueous alkali solution, a base may be added in order to improve affinity for the dispersion medium. As the base usable here, preferably usable are organic amines such as monoethanolamine, diethanolamine, triethanolamine, amine methylpropanol, and ammonia; and inorganic bases such as potassium hydroxide and sodium hydroxide. A water-soluble organic solvent for dissolving the dispersing polymer may also be added to the dispersion medium in order to make the dispersing polymer dissolve in the dispersion medium.

Here, the water-soluble organic solvent that may be used may be any of those capable of dissolving the dispersing polymer, and those enumerated below may be used, as exemplified by lower alcohols such as methanol, ethanol, 1-propanol and 2-propanol; glycols such as diethylene glycol and dipropylene glycol; glycol ethers such as ethylene glycol monomethyl ether, ethylene glycol monoethyl ether, diethylene glycol monomethyl ether, diethylene glycol monoethyl ether, propylene glycol monomethyl ether, propylene glycol monoethyl ether, dipropylene glycol monomethyl ether, and dipropylene glycol monoethyl ether; ketones such as methyl ethyl ketone; and cyclic ethers such as tetrahydrofuran. Any of these water-soluble organic solvents may previously be mixed with a solvent which contains ion-exchanged water or the like, and thereafter the dispersing polymer may be dissolved therein. Instead, the dispersing polymer may previously be dissolved in any of these water-soluble solvents, and thereafter the resultant solution may be mixed with the solvent which contains ion-exchanged water or the like.

In preparing the pigment ink, which contains the pigment, it is effective to stir the aqueous medium containing the pigment, to carry out premixing for 30 minutes or more before the dispersion treatment. That is, such premixing operation is preferable because the wettability of pigment particle surfaces can be improved to help the dispersing agent to come adsorbed on the pigment particle surfaces.

The dispersion machine used in the above dispersion treatment of the pigment may be any of dispersion machines used commonly in the art. It may include, e.g., a ball mill, a roll mill, a sand mill and Nanomizer (trade name). In particular, a high-speed type sand mill may preferably be used. Such a mill may include, e.g., Super mill, Sand grinder, Beads mill, Agitator mill, Grain mill, Dyno mill, Pearl mill and Co-ball mill (all trade names).

In the pigment ink used in the ink-jet recording process, a pigment having an optimum particle size distribution may preferably be used because of demands for anti-clogging properties and so forth. In preparing pigment inks to be used, it is desired to use pigments having an optimum particle size distribution. As methods for obtaining pigments having the desired particle size distribution, the following methods are available, which are a method of making pulverization media of the dispersion machine have a small size, a method of using pulverization media at a high packing, a method of carrying out treatment for a longer time, a method of carrying out classification by means of a filter or a centrifuge after pulverization, and combination of any of these methods.

The pigment ink of the present invention may be used in ink-jet recording processes carried out commonly. A remarkable effect is obtainable especially when used in the ink-jet recording process making use of heat energy as ejection energy.

EXAMPLES

The present invention is described below in greater detail by giving Examples and Comparative Examples. The present invention is by no means limited only to the following Examples. In the following, "part(s)" is by mass unless particularly noted.

Example 1

Synthesis of Copolymer P1

Using materials shown below, polymerization reaction was carried out in the following way and under the following conditions. FM0725 (abbreviated as FM25; number average molecular weight: about 10,000; X represents an ester group, $R_1$ represents a methyl group, $R_2$ represents a propylene group, $R_3$ to $R_6$ represent a methyl group, $R_7$ represents a hydrocarbon group in the Formula (1)), available from Chisso Corporation, was used as the silicone type macromer (abbreviated as SiM). Benzyl acrylate (abbreviated as BzA) was used as the vinyl monomer having a hydrocarbon group having 1 to 8 carbon atoms. Methacrylic acid (abbreviated as MAA) was used as the monomer having an anionic functional group. Then, in percentages by mass shown in Table 1, these materials were charged into a flask having a stirrer, a thermometer and a nitrogen feed pipe, to carry out polymerization reaction under the following conditions. That is, using 4 parts of azobisisobutylonitrile as an initiator and 500 parts of 1-methoxy-2-propanol as a solvent, the reaction was carried out at a temperature of 110° C. for 4 hours in a stream of $N_2$. Thereafter, the reaction product obtained was cooled to room temperature, and the reaction product cooled was developed in 1,000 parts of hexane to remove unreacted products by precipitation purification, followed by drying under reduced pressure to obtain Copolymer P1, having the properties shown in Table 1.

TABLE 1

Material Compositional Ratio and Properties of Copolymer P1

| | Compositional ratio (% by mass) | | | Synthesized product | | | |
|---|---|---|---|---|---|---|---|
| | FM25 (a) | BzA (b) | MAA | Mass ratio (a):(b) | SiM content (% by mass) | Acid value (mgKOH/g) | Weight average molecular weight |
| P1 | 20 | 38 | 42 | 1:2 | 20 | 272 | 16,000 |

(Preparation of Pigment Dispersion D1)

| | |
|---|---|
| Dispersing Agent 1 | 15 parts |
| Propylene glycol monomethyl ether | 50 parts |
| Ion-exchanged water | 200 parts |
| Potassium hydroxide | 1 part |

A dispersing polymer (Dispersing Agent 1) was completely dissolved, and thereafter 15 parts of carbon black (NIPEX 180 IQ, available from Degussa Corp.) was added thereto as a colorant. These were premixed for 30 minutes, followed by dispersion treatment under the following conditions. Dispersing Agent 1 used in the above was a styrene-acrylic acid copolymer (acid value: 200 mgKOH/g; weight average molecular weight: 10,000).

Dispersion machine: Sand grinder (manufactured by Igarashi Kikai).

Grinding medium: Zirconia beads (1 mm in diameter).

Packing of grinding medium: 75% by volume. Grinding time: 3 hours.

Solid matter and solvent matter were individually separated by aciding-out. To the solid matter separated, an aqueous 1% by mass KOH solution was so added as to be in a solid matter concentration of 15% by mass to obtain Pigment Dispersion D1.

Preparation of Pigment Ink I1

Using Pigment Dispersion D1 prepared as above and Copolymer P1 prepared previously, the following components were mixed to obtain Pigment Ink I1.

| | |
|---|---|
| Pigment Dispersion D1 | 30 parts |
| Copolymer P1 | 5 parts |
| Glycerol | 5 parts |
| Diethylene glycol | 5 parts |
| Isopropyl alcohol | 5 parts |
| ACETYLENOL EH | 1 part |
| (available from Kawaken Fine Chemicals Co., Ltd.) | |
| Ion-exchanged water | 49 parts |

Example 2

An example of a pigment ink making use of a silicone type macromer having a number average molecular weight of 6,000 or less is described in this Example.

Synthesis of Copolymer P2

Using the following materials formulated as shown in Table 2, polymerization reaction was carried out in the same way and under the same conditions as those in Synthesis of Copolymer P1 to obtain Copolymer P2 as shown in Table 2. FM0721 (abbreviated as FM21; number average molecular weight: about 5,000; X represents an ester group, $R_1$ represents a methyl group, $R_2$ represents a propylene group, $R_3$ to $R_6$ represent a methyl group, $R_7$ represents a hydrocarbon group in the Formula (1)), available from Chisso Corporation, was used as the silicone type macromer (abbreviated as SiM). N,N-dimethyl acrylamide (abbreviated as MMAm) was used as the vinyl monomer having a hydrocarbon group having 1 to 8 carbon atoms. Maleic acid (abbreviated as Mal) was used as the monomer having an anionic functional group.

TABLE 2

Material Compositional Ratio and Properties of Copolymer P2

| | Compositional ratio (% by mass) | | | Synthesized product | | | |
|---|---|---|---|---|---|---|---|
| | FM21 (a) | MMAm (b) | Mal | Mass ratio (a):(b) | SiM content (% by mass) | Acid value (mgKOH/g) | Weight average molecular weight |
| P2 | 12 | 60 | 28 | 1:5 | 14 | 265 | 14,200 |

Preparation of Pigment Ink I2

Pigment Ink I2 was obtained in the same way as in Example 1 except that, in preparing Pigment Ink I1 of Example 1, Copolymer P2 obtained as above was used in place of Copolymer P1.

Example 3

An example of a pigment ink making use of acrylic acid as the monomer having an anionic functional group is described in this Example.

Synthesis of Copolymer P3

Using the following materials formulated as shown in Table 3, polymerization reaction was carried out in the same way and under the same conditions as those in Synthesis of Copolymer P1 to obtain Copolymer P3 as shown in Table 3. FM0721 (abbreviated as FM21; number average molecular weight: about 5,000; X represents an ester group, $R_1$ represents a methyl group, $R_2$ represents a propylene group, $R_3$ to $R_6$ represent a methyl group, $R_7$ represents a hydrocarbon group in the Formula (1)), available from Chisso Corporation, was used as the silicone type macromer (abbreviated as SiM). N,N-dimethyl acrylamide (abbreviated as MMAm) was used as the vinyl monomer having a hydrocarbon group having 1 to 8 carbon atoms. Acrylic acid (abbreviated as AA) was used as the monomer having an anionic functional group.

TABLE 3

Material Composition and Properties of Copolymer P3

| | Compositional ratio (% by mass) | | | Synthesized product | | | |
|---|---|---|---|---|---|---|---|
| | FM21 (a) | MMAm (b) | AA | Mass ratio (a):(b) | SiM content (% by mass) | Acid value (mgKOH/g) | Weight average molecular weight |
| P3 | 18 | 48 | 34 | 1:3 | 17 | 163 | 13,900 |

Examples 4 to 8

In Examples 4 to 8, examples of pigment inks of Examples 4 to 8 are described which contained Copolymers P4 to P8, respectively, in which the proportion of the silicone type macromer to the vinyl monomer having a hydrocarbon group having 1 to 8 carbon atoms and the content of the silicone type macromer were changed.

Synthesis of Copolymers P4 to P8

X-24-8201 (abbreviated as X24; number average molecular weight: about 2,500; X represents an ester group, $R_1$ represents a methyl group, $R_2$ represents a propylene group, $R_3$ to $R_6$ represent a methyl group, $R_7$ represents a hydrocarbon group in the Formula (1)), available from Shin-Etsu Silicone Co., Ltd., was used as the silicone type macromer (abbreviated as SiM). n-Butyl methacrylate (abbreviated as BMA) was used as the vinyl monomer having a hydrocarbon group having 1 to 8 carbon atoms. Acrylic acid (abbreviated as AA) was used as the monomer having an anionic functional group. As another monomer, 2-hydroxyhexyl methacrylate (abbreviated as AA) was also used. Then, controlling the proportion of the solvent to the monomers appropriately, the procedure of Synthesis of Copolymer P1 was repeated to obtain Copolymers P4 to P8 having composition and properties shown in Table 4.

TABLE 4

Material Composition and Properties of Copolymers P4 to P8

| | Compositional ratio (% by mass) | | | | Synthesized product | | | |
|---|---|---|---|---|---|---|---|---|
| | X24 (a) | BMA (b) | HEMA | AA | Mass ratio (a):(b) | SiM content (% by mass) | Acid value (mgKOH/g) | Weight average molecular weight |
| P4 | 44 | 28 | 4 | 24 | 1:1 | 42 | 182 | 12,300 |
| P5 | 22 | 48 | 6 | 24 | 1:3 | 21 | 185 | 12,200 |
| P6 | 12 | 58 | 6 | 24 | 1:5 | 12 | 188 | 11,800 |
| P7 | 7 | 60 | 7 | 26 | 1:8 | 7 | 205 | 12,500 |
| P8 | 4 | 58 | 10 | 28 | 1:12 | 3 | 222 | 12,000 |

Preparation of Pigment Inks I4 to I8

Pigment Inks I4 to I8 were obtained in the same way as in Example 1 except that, in preparing Pigment Ink I1 of Example 1, Copolymers P4 to P8 obtained as above were used, respectively, in place of Copolymer P1.

Examples 9 to 13

Synthesis of Copolymers P9 to P13

Using the following materials formulated as shown in Table 5, polymerization reaction was carried out in the same way and under the same conditions as those in Synthesis of Copolymer P1 to obtain Copolymers P9 to P13 as shown in Table 5, having different acid values. FM0711 (abbreviated as FM11; number average molecular weight: about 1,000; X represents an ester group, $R_1$ represents a methyl group, $R_2$ represents a propylene group, $R_3$ to $R_6$ represent a methyl group, $R_7$ represents a hydrocarbon group in the Formula (1)), available from Chisso Corporation, was used as the silicone type macromer (abbreviated as SiM). Styrene (abbreviated as Sty) was used as the vinyl monomer having a hydrocarbon group having 1 to 8 carbon atoms. Acrylic acid (abbreviated as AA) was used as the monomer having an anionic functional group. At that time, the proportion of the solvent and the monomers was adjusted appropriately.

TABLE 5

Material Composition and Properties of Copolymers P9 to P13

| | Compositional ratio (% by mass) | | | Synthesized product | | | |
|---|---|---|---|---|---|---|---|
| | FM11 (a) | Sty (b) | AA | Mass ratio (a):(b) | SiM content (% by mass) | Acid value (mgKOH/g) | Weight average molecular weight |
| P9 | 20 | 75 | 5 | 1:3 | 20 | 32 | 9,800 |
| P10 | 25 | 65 | 10 | 1:3 | 22 | 86 | 10,000 |
| P11 | 25 | 55 | 20 | 1:2 | 24 | 147 | 9,900 |
| P12 | 22 | 50 | 28 | 1:3 | 20 | 220 | 9,800 |
| P13 | 25 | 40 | 35 | 1:2 | 25 | 281 | 10,000 |

Preparation of Pigment Inks I9 to I13

Pigment Inks I9 to I13 were obtained in the same way as in Example 1 except that, in preparing Pigment Ink I1 of Example 1, Copolymers P9 to P13 obtained as above were used, respectively, in place of Copolymer P1.

Example 14

An example of a pigment ink making use of a cyan pigment as the colorant in place of carbon black is described in this Example.

Preparation of Pigment Dispersion D2

Pigment Dispersion D2 was obtained in the same way as in Example 1 except that, in preparing Pigment Dispersion D1 of Example 1, a cyan pigment (FASTOGEN Blue 5380 SD, available from Dainippon Ink & Chemicals, Incorporated) was used as the colorant in place of the carbon black (NIPEX 180IQ, available from Degussa Corp.).

Preparation of Pigment Ink I11C

Pigment Ink I11C was obtained in the same way as in Example 1 except that, in preparing Pigment Ink I1 of Example 1, Pigment Dispersion D2 and Copolymer P11 were used in place of Pigment Dispersion D1 and Copolymer P1, respectively.

Example 15

An example of a pigment ink making use of a magenta pigment as the colorant in place of carbon black is described in this Example.

Preparation of Pigment Dispersion D3

Pigment Dispersion D3 was obtained in the same way as in Example 1 except that, in preparing Pigment Dispersion D1 of Example 1, a magenta pigment was used as the colorant in place of the carbon black (NIPEX 180IQ, available from Degussa Corp.). CROMOPHTAL MAGENTA ST (available from Ciba Specialty Chemicals Inc.) was used as the magenta pigment.

Preparation of Pigment Ink I11M

Pigment Ink I11M was obtained in the same way as in Example 14 except that, in preparing Pigment Ink I11C of Example 14, Pigment Dispersion D3 prepared as above was used in place of Pigment Dispersion D2.

Example 16

An example of a pigment ink making use of a yellow pigment as the colorant in place of carbon black is described in this Example.

Preparation of Pigment Dispersion D4

Pigment Dispersion D4 was obtained in the same way as in Example 1 except that, in preparing Pigment Dispersion D1 of Example 1, a yellow pigment was used as the colorant in place of the carbon black (NIPEX 180 IQ, available from Degussa Corp.). Hanza Brilliant Yellow 5GXB (available from Clariant (Japan) K.K.) was used as the yellow pigment.

Preparation of Pigment Ink I11Y

Pigment Ink I11Y was obtained in the same way as in Example 14 except that, in preparing Pigment Ink I11C of Example 14, Pigment Dispersion D4 prepared as above was used in place of Pigment Dispersion D2.

Example 17

In this Example, an example of a pigment ink is described which makes use of an acrylic acid macromer AA as the monomer having an anionic functional group that makes up the copolymer in the ink.

Synthesis of Acrylic Acid Macromer AA (M)

Using 10 parts of α-methylstyrene dimer and 40 parts of acrylic acid as constituent materials for a macromer, radical polymerization was carried out at a temperature of 75° C. in a stream of $N_2$, in 500 parts of propylene glycol monomethyl ether. Unreacted products were removed by precipitation purification, followed by drying under reduced pressure to obtain the acrylic acid macromer AA (M). This acrylic acid macromer AA (M) had a weight average molecular weight of 770.

Synthesis of Copolymer P14

X-24-8201 (abbreviated as X24; number average molecular weight: about 2,500; X represents an ester group, $R_1$ represents a methyl group, $R_2$ represents a propylene group, $R_3$ to $R_6$ represent a methyl group, $R_7$ represents a hydrocarbon group in the Formula (1)), available from Shin-Etsu Silicone Co., Ltd., was used as the silicone type macromer (abbreviated as SiM). Cyclohexyl acrylamide (abbreviated as cHAm) was used as the vinyl monomer having a hydrocarbon group having 1 to 8 carbon atoms. The acrylic acid macromer AA (M) obtained as above was used as the monomer having an anionic functional group. Then, the procedure of Synthesis of Copolymer P1 was repeated to obtain Copolymer P14 as shown in Table 6.

TABLE 6

Material Composition and Properties of Copolymer P14

| | Compositional ratio (% by mass) | | | Synthesized product | | | |
|---|---|---|---|---|---|---|---|
| | X24 (a) | cHAm (b) | AA (M) | Mass ratio (a):(b) | SiM content (% by mass) | Acid value (mgKOH/g) | Weight average molecular weight |
| P14 | 16 | 70 | 14 | 1:4 | 13 | 114 | 11,000 |

Preparation of Pigment Ink I14

Pigment Ink I14 was obtained in the same way as in Example 1 except that, in preparing Pigment Ink I1 of Example 1, Copolymer P14 obtained as above was used in place of Copolymer P1.

Example 18

An example of a pigment ink making use of the copolymer as a dispersing agent is described in this Example.

Preparation of Pigment Dispersion D5

Pigment Dispersion D5 was obtained in the same way as in Example 1 except that, in preparing Pigment Dispersion D1 of Example 1, Copolymer P12 as used in Example 12 was used as the dispersing agent.

Preparation of Pigment Ink I15

Pigment Ink I15 was obtained in the same way as in Example 1 except that, in preparing Pigment Ink I1 of Example 1, Pigment Dispersion D5 was used in place of Pigment Dispersion D1.

Comparative Example 1

A system where any copolymer is not used in preparing a pigment ink is described in this Comparative Example.

Preparation of Pigment Ink I16

Pigment Ink I16 of Comparative Example was obtained in the same way as in Example 1 except that, in preparing Pigment Ink I1 of Example 1, ion-exchanged water was used in place of Copolymer P1 in the same quantity. That is, the pigment ink of this Comparative Example does not contain the copolymer.

Comparative Example 2

In this Comparative Example, an example is described in which, of the polymerization components for the copolymer to be added to the ink, a vinyl monomer having a long-chain alkyl group having 12 or more carbon atoms is used in place of the vinyl monomer having a hydrocarbon group having 1 to 8 carbon atoms.

Synthesis of Copolymer P15

Using the following materials formulated as shown in Table 7, polymerization reaction was carried out in the same way as in Synthesis of Copolymer P1 to obtain Copolymer P15 as shown in Table 7. X-24-8201 (abbreviated as X24; number average molecular weight: about 2,500; X represents an ester group, $R_1$ represents a methyl group, $R_2$ represents a propylene group, $R_3$ to $R_6$ represent a methyl group, $R_7$ represents a hydrocarbon group in the Formula (1)), available from Shin-Etsu Silicone Co., Ltd., was used as the silicone type macromer (abbreviated as SiM). Acrylic acid (abbreviated as AA) was used as the monomer having an anionic functional group. Octadecyl methacrylate (abbreviated as ODMA), having 18 carbon atoms, was used in place of the vinyl monomer having a hydrocarbon group having 1 to 8 carbon atoms.

TABLE 7

Material Composition and Properties of Copolymer P15

| | Synthesized product | | | | |
|---|---|---|---|---|---|
| | Compositional ratio (% by mass) | | | SiM content | Acid value | Weight average molecular |
| | X24 (a) | ODMA | AA | (% by mass) | (mgKOH/g) | weight |
| P15 | 10 | 65 | 25 | 11 | 164 | 25,000 |

Preparation of Pigment Ink I17

Pigment Ink I17 of Comparative Example was obtained in the same way as in Example 1 except that, in preparing Pigment Ink I1 of Example 1, Copolymer P15 obtained as above was used in place of Copolymer P1.

Next, the respective pigment inks of Examples and Comparative Examples, obtained as above, were evaluated on their properties in the following way. This is reported below.

Evaluation of Storage Stability:

To evaluate ink storage stability, 50 ml each of the pigment inks were each put into a container made of polyethylene, having an inner volume of 100 ml, and were stored at 60° C. for 3 months. The particle diameter and ink viscosity were measured before and after the storage, and the rates of changes in these were evaluated according to the following criteria. The results of evaluation are shown together in Table 8.

Evaluation Criteria:
AA: The rates of changes are less than 5%.
A: The rates of changes are from 5% or more to less than 10%.
C: The rates of changes are 10% or more.

Evaluation of Ejection Stability:

To evaluate ink ejection stability, images were formed in the following way, and recorded images obtained were evaluated in the following way. Each pigment ink was filled into an ink-jet cartridge, and print was obtained in the following way, using a recording head mounted to an ink-jet printer PIXUS 850i (manufactured by CANON INC.). That is, in a plain paper standard mode, which is a high-speed printing mode, images were continuously recorded on 1,000 sheets of ink-jet plain paper LC-301 (available from CANON INC.). In regard to the inks making use of carbon black as colorants, the optical density of print on the first sheet and that on the 1,000th sheet were measured with a reflection densitometer RD-19I (manufactured by Gretag Macbeth Ag). Then, the rate of change in optical density was calculated in the following way. The rate of change thus found was used to make evaluation according to the following criteria. The results of evaluation are shown together in Table 8.

Rate of change in optical density ratio (%)=(optical dens on the 1,000th sheet/optical denisty on the first sheet)×100.

Evaluation Criteria:
A: The rate of change in optical density is 90% or more.
B: The rate of change in optical density is from 60% or more to less than 90%.
C: The rate of change in optical density is less than 60%.

In regard to the inks making use of colorants other than carbon black as colorants of the inks, the following measurement was made. Chroma* of print on the first sheet and that on the 1,000th sheet were measured with a reflection densitometer RD-19I (manufactured by Gretag Macbeth Ag) according to L*a*b* of the color difference indication method prescribed by CIE. Then, the rate of change in chroma was calculated in the following way. The rate of change thus found was used to make evaluation according to the following criteria. The results of evaluation are shown in Table 8.

Chroma*={$(a*)^2+(b*)^2$}$^{1/2}$.

Rate of change in chroma (%)=(chroma on the 1,000th sheet/chroma on the first sheet)×100.

Evaluation Criteria:
A: The rate of change in chroma is 90% or more.
B: The rate of change in chroma is from 60% or more to less than 90%.
C: The rate of change in chroma is less than 60%.

Evaluation of Image Scratch Resistance:

To evaluate scratch resistance of print, an evaluation sample was prepared in the following way. Using the evaluation sample, the evaluation was made in the following way. Each pigment ink was filled into an ink-jet cartridge, and images were printed to prepare the evaluation sample, using a recording head mounted to an ink-jet printer PIXUS 950i (manufactured by CANON INC.). To prepare the evaluation sample, solid patterns were printed on commercially available gloss paper Professional Photopaper PR101, L-size (available from CANON INC.). A Scotch tape was stuck to printed areas of the evaluation sample obtained. A weight of 500 g in weight was put thereon for 30 seconds, and thereafter the Scotch tape was peeled off. On this occasion, the optical density of printed areas before the Scotch tape was stuck and that after it was peeled off were measured with a reflection densitometer RD-19I (manufactured by Gretag Macbeth Ag). Then, from the optical densities thus found, the remaining pigment ratio was calculated to make evaluation according to the following criteria. The results of evaluation are shown in Table 8.

Remaining pigment ratio (%)=(optical density after scratch resistance test/optical density before scratch resistance test)×100.

Evaluation Criteria:
AA: The remaining pigment ratio is 80% or more.
A: The remaining pigment ratio is from 70% or more to less than 80%.
B: The remaining pigment ratio is from 60% or more to less than 70%.
C: The remaining pigment ratio is less than 60%.

TABLE 8

| | | Evaluation results | | | |
|---|---|---|---|---|---|
| | | Storage stability | | | |
| | Ink | Change in particle diameter | Change in viscosity | Ejection stability | Image Scratch resistance |
| Example: | | | | | |
| 1 | I1 | A | A | A | A |
| 2 | I2 | A | A | A | A |
| 3 | I3 | A | A | A | A |
| 4 | I4 | A | A | A | A |
| 5 | I5 | A | A | A | AA |
| 6 | I6 | A | A | A | AA |
| 7 | I7 | A | A | A | AA |
| 8 | I8 | A | A | A | A |

TABLE 8-continued

| | | Evaluation results | | | |
|---|---|---|---|---|---|
| | | Storage stability | | | |
| | Ink | Change in particle diameter | Change in viscosity | Ejection stability | Image Scratch resistance |
| 9 | I9 | A | A | A | A |
| 10 | I10 | AA | AA | A | AA |
| 11 | I11 | AA | AA | A | AA |
| 12 | I12 | AA | AA | A | AA |
| 13 | I13 | A | A | A | A |
| 14 | I11C | AA | AA | A | AA |
| 15 | I11M | AA | AA | A | AA |
| 16 | I11Y | AA | AA | A | AA |
| 17 | I14 | A | A | A | A |
| 18 | I15 | A | A | A | A |
| Comparative Example: | | | | | |
| 1 | I16 | C | C | C | C |
| 2 | I17 | C | C | C | A |

As shown in Table 8, according to the present invention, the ink-jet recording pigment ink is provided which has a high ejection stability even when used in the ink-jet recording process in which heat energy is given to an ink as ejection energy to eject the ink. In addition, according to the present invention, an ink-jet recording pigment ink is provided which can obtain recorded images that are free of offset even when a plurality of sheets of gloss paper as a recording medium for ink-jet recording are superposed immediately after printing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-336584, filed Dec. 14, 2006, which is hereby incorporated by reference herein in its entirety.

What is claimed is:

1. An ink-jet recording pigment ink comprising:
water;
a pigment;
a water-soluble organic solvent; and
a copolymer,
wherein the copolymer is a copolymer obtained by copolymerizing a silicone type macromer having a vinyl group, represented by the following Formula (1), a vinyl monomer having a hydrocarbon group having 1 to 7 carbon atoms, represented by the following Formula (2), and a monomer having an anionic functional group:

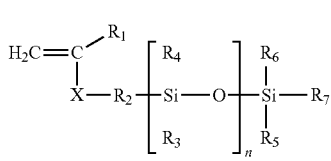

Formula (1)

wherein X represents a single bond or an ester group, $R_1$ represents a hydrogen atom or a methyl group, $R_2$ represents a single bond or an alkylene group having 1 to 4 carbon atoms, $R_3$ to $R_6$ each independently represent an alkyl group having 1 to 4 carbon atoms, $R_7$ represents a hydrocarbon group which may have a hetero atom, and n represents an integer of 8 or more, and

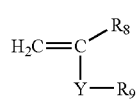

Formula (2)

wherein Y represents a single bond, an ester group or an amide group, $R_8$ represents a hydrogen atom or a methyl group, and $R_9$ represents a hydrocarbon group having 1 to 7 carbon atoms.

2. The ink-jet recording pigment ink according to claim 1, wherein the silicone type macromer having a vinyl group has a number average molecular weight of 6,000 or less.

3. The ink-jet recording pigment ink according to claim 1, wherein the monomer having an anionic functional group is an acrylic acid monomer.

4. The ink-jet recording pigment ink according to claim 3, wherein the acrylic acid monomer is copolymerized as an acrylic acid macromer.

5. The ink-jet recording pigment ink according to claim 1, wherein the copolymerization ratio of the silicone type macromer having a vinyl group to the vinyl monomer having a hydrocarbon group having 1 to 7 carbon atoms (silicone type macromer:vinyl monomer) is from 1:1 to 1:10 in mass ratio.

6. The ink-jet recording pigment ink according to claim 1, wherein, in the monomers that constitute the copolymer, the silicone type macromer is in a content of from 5% by mass to 40% by mass.

7. The ink-jet recording pigment ink according to claim 1, wherein the copolymer has an acid value of 50 mgKOH/g to 250 mgKOH/g.

8. The ink-jet recording pigment ink according to claim 1, wherein the copolymer is contained as a dispersing resin for the pigment.

9. The ink-jet recording pigment ink according to claim 1, wherein $R_9$ is a straight-chain alkyl group.

10. The ink-jet recording pigment ink according to claim 1, wherein $R_9$ is a branched-chain alkyl group.

11. The ink-jet recording pigment ink according to claim 1, wherein $R_9$ is a cyclic alkyl group.

12. The ink-jet recording pigment ink according to claim 1, wherein $R_9$ is a hydrocarbon group having a benzene ring.

13. The ink-jet recording pigment ink according to claim 1, wherein the vinyl monomer represented by Formula (2) is propylene.

14. The ink-jet recording pigment ink according to claim 1, wherein the vinyl monomer represented by Formula (2) is butylene.

15. The ink-jet recording pigment ink according to claim 1, wherein the vinyl monomer represented by Formula (2) is styrene.

16. The ink-jet recording pigment ink according to claim 1, wherein the vinyl monomer represented by Formula (2) is selected from the group consisting of acrylates, methacrylates, acrylamides, and methacrylamides.

17. The ink-jet recording pigment ink according to claim 16, wherein the vinyl monomer represented by Formula (2) is methyl acrylate or methyl methacrylate.

18. The ink-jet recording pigment ink according to claim 16, wherein the vinyl monomer represented by Formula (2) is ethyl acrylate or ethyl methacrylate.

19. The ink-jet recording pigment ink according to claim 16, wherein the vinyl monomer represented by Formula (2) is n-butyl acrylate or n-butyl methacrylate.

20. The ink-jet recording pigment ink according to claim 16, wherein the vinyl monomer represented by Formula (2) is t-butyl acrylate or t-butyl methacrylate.

21. The ink-jet recording pigment ink according to claim 16, wherein the vinyl monomer represented by Formula (2) is cyclohexyl acrylate or cyclohexyl methacrylate.

22. The ink-jet recording pigment ink according to claim 16, wherein the vinyl monomer represented by Formula (2) is benzyl acrylate or benzyl methacrylate.

23. The ink-jet recording pigment ink according to claim 16, wherein the vinyl monomer represented by Formula (2) is N-methyl acrylamide or N-methyl methacrylamide.

24. The ink-jet recording pigment ink according to claim 16, wherein the vinyl monomer represented by Formula (2) is N-ethyl acrylamide or N-ethyl methacrylamide.

25. The ink-jet recording pigment ink according to claim 16, wherein the vinyl monomer represented by Formula (2) is N,N-dimethyl acrylamide or N,N-diethyl acrylamide.

26. The ink-jet recording pigment ink according to claim 16, wherein the vinyl monomer represented by Formula (2) is N-butyl acrylamide or N-butyl methacrylamide.

27. The ink-jet recording pigment ink according to claim 16, wherein the vinyl monomer represented by Formula (2) is t-butyl acrylamide or t-butyl methacrylamide.

28. The ink-jet recording pigment ink according to claim 16, wherein the vinyl monomer represented by Formula (2) is N-cyclohexyl acrylamide or N-cyclohexyl methacrylamide.

29. The ink-jet recording pigment ink according to claim 16, wherein the vinyl monomer represented by Formula (2) is N-(1-ethyl-1-methylpropyl)acrylamide.

30. The ink-jet recording pigment ink according to claim 16, wherein the vinyl monomer represented by Formula (2) is N-benzyl acrylamide or N-benzyl methacrylamide.

* * * * *